Figure 1:
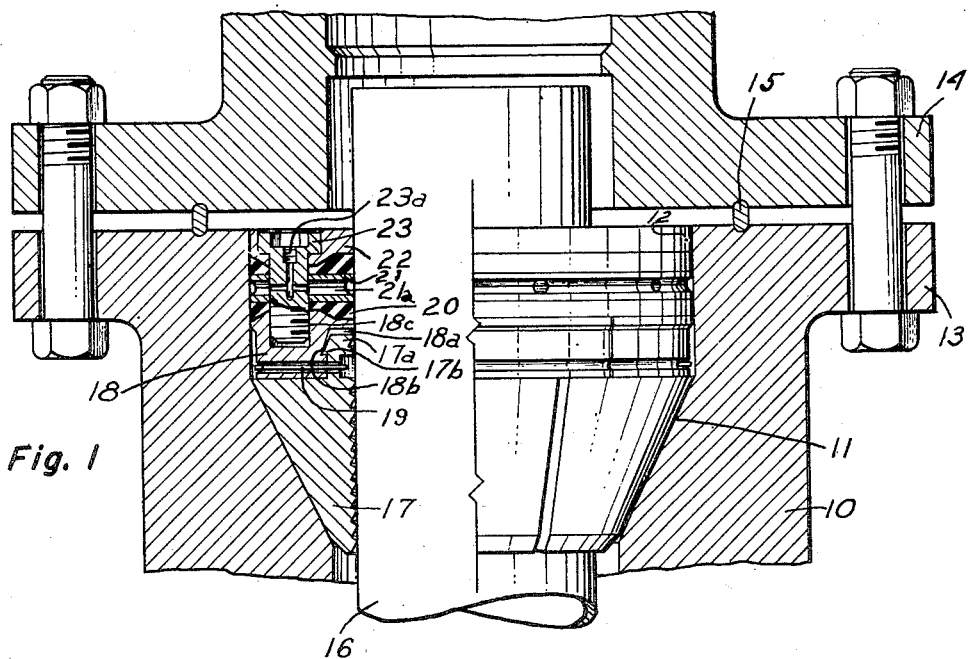

Nov. 28, 1950     H. ALLEN ET AL     2,531,596
MEANS FOR SEALING AND TESTING WELLHEAD CONNECTIONS
Filed Dec. 4, 1948     2 Sheets—Sheet 1

Herbert Allen
Madden T. Works
INVENTOR

BY Browning & Simms

ATTORNEYS

Patented Nov. 28, 1950

2,531,596

UNITED STATES PATENT OFFICE 2,531,596

MEANS FOR SEALING AND TESTING WELLHEAD CONNECTIONS

Herbert Allen and Madden T. Works, Houston, Tex., assignors to Cameron Iron Works, Inc., Houston, Tex., a corporation of Texas Application December 4, 1948, Serial No. 63,496

15 Claims. (Cl. 285—22)

1

This invention relates to means for suspending and sealing a string of well casing or other pipe in a well bore and sealing the connection against the escape of fluid under pressure from the well and for testing such seals to ascertain whether a reliable seal has been obtained.

The primary object of this invention is to provide well-head equipment whereby a string of pipe may be readily suspended in a casing head and a tight seal obtained around the casing at one or more locations, and also to enable the operator to test such seal or seals before the well is put into operation.

Another object of this invention is to provide a plurality of seals about casing or similar pipe suspended within a casing head and to enable tests of such seals either during the installation of the well-head equipment or after completion of the assembly.

Another object of this invention is to provide a slip suspension for casing or similar pipe within a casing head in combination with a packoff assembly whereby an adjustable seal is obtained around the casing independently of pressure exerted on the slips by the weight of the casing string.

A further object of this invention is to provide a seal around casing or similar pipe suspended within a casing head wherein one or more resilient packing members are compressed between gland rings by a plurality of circumferentially spaced bolts threading into one of the gland rings, and to test the efficacy of such seal through one or more of such bolts.

Another object is to provide a slip suspension for casing or similar pipe within a casing head in combination with a packoff assembly whereby a seal is obtained around the casing independently of pressure exerted on the slips by the weight of the casing string, yet in which the seal will be anchored by the weight of the casing string to prevent it from being blown out of place by excessive pressures within the well, and in which the seal and slip means are joined together for handling as a unit.

Another object is to provide a sealing structure in which the application of high pressures over large areas is avoided.

Other objects and advantages will be apparent from the following description taken in connection with the accompanying drawings illustrating presently preferred embodiments of this invention and wherein similar reference numerals designate similar parts throughout the several views.

2

Figure 2:
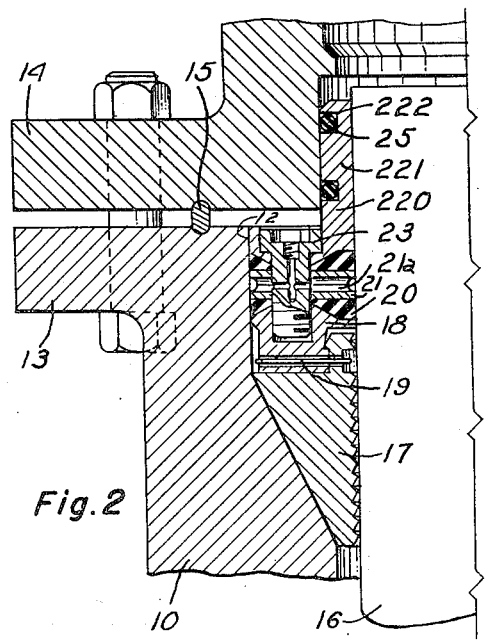
Figure 3:
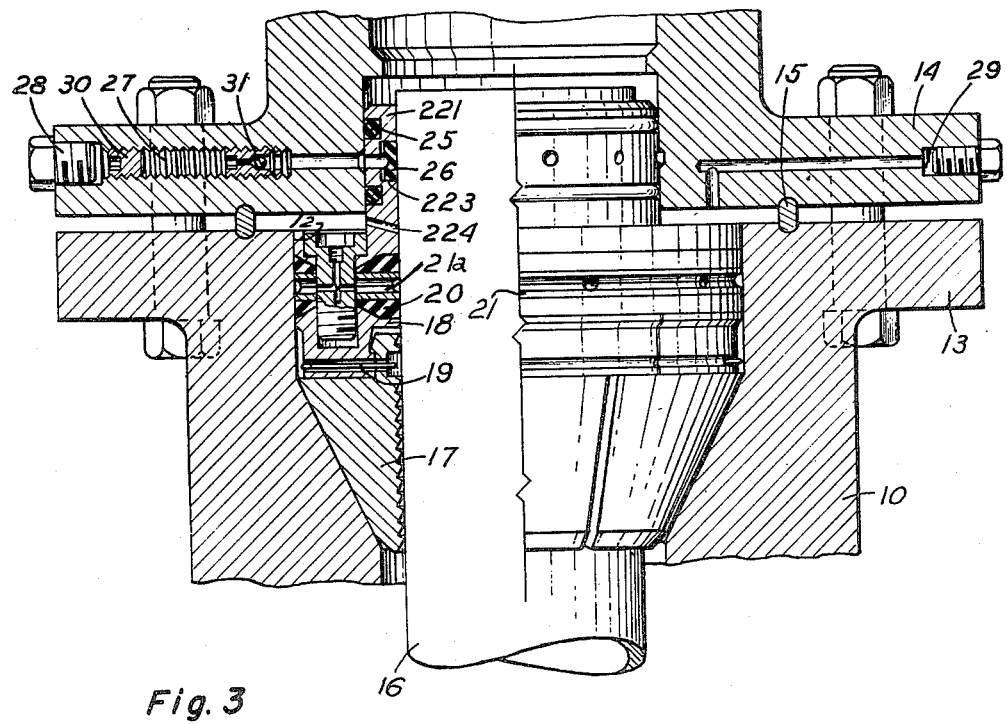

In the drawings:

Fig. 1 is a vertical sectional view illustrating one embodiment of the invention and showing a string of pipe suspended in its supporting structure with suitable seals and testing means therefor in place around the pipe;

Fig. 2 is a vertical section through a portion of a well-head structure showing a pipe suspended therein, the view illustrating a second embodiment wherein additional seals are provided in spaced relation to those shown in Fig. 1; and Fig. 3 is a vertical section through a well-head structure showing a pipe suspended therein, illustrating a third embodiment wherein a seal addition to those shown in Fig. 2 is provided and wherein additional testing means is provided for the several seals.

Referring now in detail to the drawings, and particularly to the embodiment illustrated in Fig. 1, the numeral 10 designates a casing head which may be supported conventionally upon the surface casing (not shown) and provided centrally with an inclined bowl portion 11 below a cylindrical portion 12 of relatively large diameter. The upper end of the casing head 10 is formed with a lateral flange 13 provided with a plurality of openings through which it may be bolted to the flange 14 of an upper well equipment member, such as another casing head, tubing head, blowout preventer, valve or the like. The facing sides of flanges 13 and 14 have registering grooves to receive the metal seal ring 15 which forms a fluid-tight seal between them.

A string of well casing 16 or similar pipe is suspended from casing head 10 by a series of downwardly tapering wedge-shaped slips 17 whose inner faces are toothed to engage and support the casing 16 and whose outer tapering faces engage the bowl portion 11 of the casing head. Slips 17 are loosely connected prior to assembly around casing 16 with the lower portion of a divided gland member 18, as by cotter pins 19 extending through aligned radial openings in the connected members, grooves being provided in the inner faces of the slips and in the outer faces of the divided gland ring to house the respective ends of such cotter pins out of contact with either casing 16 or casing head 10. The lower corners of the inner faces of the divided gland ring segments are recessed, as at 18a, to provide room for the reduced head portions 17a of the slip segments. Shoulders 17b and 18b are provided respectively on the head portions of the slips and the outer wall of the recess 18a, such shoulders overlapping, when the elements are assembled, to make it possible to handle the entire assembly as a unit before and while installing same and to provide for the anchoring of the seal by the weight of the casing when the casing is suspended on the slips, while permitting slight relative movements as the slip segments adjust themselves into holding positions around the casing 16. The upper faces of the divided gland ring segments are crowned to aid in properly compressing packing rings 20 hereinafter more fully described, and at spaced intervals around the divided gland ring 18 threaded apertures 18c extend downwardly for a substantial distance from such upper faces.

Superposed upon the divided gland 18 in the assembly is the packing means 20, herein shown as a unit consisting of a pair of molded resilient packing rings separated by a pair of thin steel rings 21 of slightly lesser diameter than the resilient rings and provided at intervals with oppositely facing radial grooves mating in the assembly to form apertures 21a extending through the packing means, whereby fluid under pressure can be conducted to both axial faces of the packing means in testing the seal. Spaced openings are arranged in the packing unit to align with threaded apertures 18c in the divided gland ring 18.

A gland ring 22 having its underside shaped substantially as a mirror image of the upper surface of ring 18, is superposed upon the packing rings 20. Openings for the reception of headed bolts or cap screws 2 are spaced circumferentially around gland ring 22 in positions to align with the threaded apertures 18c in the lower gland ring 18. The heads of bolts 23 are countersunk into the openings in upper gland ring 22 and are provided with non-circular sockets for the reception of a suitable wrench. When bolts 23 are inserted through the openings in the upper gland ring 22 and the packing unit 20 into threading engagement with aperture 18c in the lower divided gland ring 18, they are tightened down progressively to compress the resilient rings of the packing unit and expand them transversely of the casing axis to form seals between the casing 16 and the cylindrical portion 12 of the casing head.

To facilitate testing of the seals provided by packing unit 20, one of the headed bolts 23 is provided with a threaded passage 23a for the reception of the nozzle of a high pressure fluid testing system, and with openings leading from such passage to one of the radial apertures 21a in the steel rings 21 of the packing unit, whereby fluid under pressure may be forced against both the casing 16 and the cylindrical wall of the casing head, the spaces between the edges of the steel rings 21 and such surfaces serving to transmit the fluid around the entire packing unit and the several radial apertures 21a aiding in the fluid distribution. Such tests are made prior to the securing of additional well-head equipment 14 upon the casing head and are primarily intended to determine the efficacy of the seals formed by the molded resilient packing rings when the headed bolts 23 are being adjusted around the packoff assembly. When the seals are satisfactory, the additional well-head equipment and the metal sealing ring 15 are mounted as shown in Fig. 1.

The seals effected by the packing unit 20 hold back fluids under pressure outside of casing 16, and may be useful in restraining the flow of such fluids as emanate from within casing 16. The latter fluids, however, would exert their main pressures upon the sealing ring 15 between the flanges 13 and 14 of adjacent well-head members and the large area surfaces of flanges 13 and 14 within ring 15. While seals 15 and bolts 23 are of comparatively heavy material, and are sufficient to hold relatively low pressures, it is desirable to shield them from strain due to force exerted by very high pressures within the well casing acting over the large areas of flanges 13 and 14 within the ring 15.

In Fig. 2 means are shown for utilizing all of the advantageous features of the device shown in Fig. 1 along with means for preventing undue strain upon the flanges and bolts due to very high pressures within casing 16. In this second embodiment the upper gland ring 220 is provided with a cylindrical extension 221 adapted to fit closely around the casing 16 on its inner periphery, and is provided with grooves 222 in its outer periphery for the reception of conventional O-rings 25 to seal against the inner peripheral wall of the well-head equipment member 14. As many annular grooves 222 may be provided as desired to combat the estimated pressures in a well about to be equipped, and while other forms of packing may be substituted at will, it has been found that O-rings 25 will satisfactorily restrain fluid pressures around the outer periphery of the cylindrical extension 221, and keep high pressures from within the metallic sealing ring 15 between the flanges 13 and 14. The cheapness, effectiveness and ease of assembly of O-rings are the prime factors recommending them for this use, it being understood that other types of sealing rings may be employed in their stead if desired, without departing from this invention.

In Fig. 3 we have shown means for additionally sealing the inner periphery of the cylindrical extension 221 against the wall of casing 16 and for making possible the testing of all seals provided. An annular recess 223 of comparatively large extent is arranged in the inner peripheral wall of extension 221, preferably between O-rings 25 substantially as shown. Packing 26 is mounted in recess 223, and means are provided for injecting a plastic or fluid behind packing 26 for compressing packing 26 to effectively seal against passage of fluids under pressure from within casing 16 downwardly along the outer face of the casing. As herein shown plastic packing material may be forced through opening 27 in the flange 14 of the upper well-head member by application of a quantity thereof in opening 27 and tightening up on plug 30 threaded in opening 27 as well known in the trade. The plastic packing material admitted through the valved opening 27 passes around recess 223 behind packing 26, forcing such packing into sealing engagement with casing 16 and filling all spaces between the packing and the walls of the recess 223. A plug 28 is provided to close the opening 27 at all times except when plastic is being introduced therethrough and back pressure check valve 31 and plug 30 retain the material under pressure. This seal obviously can be tended to and maintained in good order due to its accessibility exteriorly of the well-head equipment.

Means have also been provided in the embodiment illustrated in Fig. 3 for testing all seals prior to putting the well into operation or at any time thereafter. An opening 29 with a removable plug therein is provided in the periphery of flange 14 of the upper well-head member and passages lead therefrom to the lower wall of flange 14 between casing 16 and metallic seal 15. A suitable nozzle forming part of a high-pressure testing fluid system may be connected at will to opening 29 by first removing the plug. Fluids admitted through opening 29 will exert pressure against seal 15 and all seals between casing 16 and either the casing head 10 or upper well-head member 14, one or more apertures 224 being arranged in the cylindrical extension 220 in line with the opening between flanges 13 and 14 to transmit fluid under pressure against the periphery of casing 16, and so testing the seal provided by packing 26 as well as the seals provided by the inner faces of the packing unit 20. The efficacy of the seals formed by O-rings 25 would also be tested against the passage of fluids under pressure upwardly from between flanges 13 and 14.

In the course of testing as described, sealing material might be blown out under pressure tests, but the locating of such defects in advance and substitution of fully operative members before well completion is of much greater importance. Leaks around the faces of the molded resilient packing rings in packing unit 20 may ordinarily be stopped by tightening bolts 23, and leaks around packing 26 may be stopped by addition of plastic packing through valved passageway 27, and tests can be repeated after each adjustment and from time to time during service to make certain that the seals are adequate.

It will be noted that the weight of the string of casing 16 is carried entirely by slips 17 and casing head 10, and is not transmitted to the packoff assembly in a manner tending to break the seals. Also the pressure exerted inwardly against casing 16 by slips 17 is at a position spaced from the test pressure area so the casing is not subjected to a cumulative collapsing pressure at a single area. Moreover both inner and outer faces of the molded resilient packing rings of unit 20 engage cylindrical surfaces at all times. The upper gland ring 22 with or without its cylindrical extension 220 is formed of ample material for carrying the countersunk heads of bolts 23 and continuously transmitting selected pressure adjustments upon the molded resilient rings 20 in cooperation with the segments of the lower divided gland ring 18, which also is amply capable of maintaining the desired resistances. The complete hanging and seal-off assembly may be utilized as a unit as all of the parts may be loosely secured together.

It is further to be noted that any desired testing method may be utilized in connection with our improved well-head equipment, and no attempt has been made to portray or describe any particular method of exerting pressure for testing purposes.

While the illustrated embodiments herein shown are believed to adequately fulfill the objects and advantages herein stated, it is to be understood that this invention is susceptible to modification and variation within the scope of the subjoined claims.

Having described our invention, we claim:

1. In well-head equipment including a casing head having a tapered slip bowl portion, and a pipe to have a sealed suspension therein, a hanging and packoff assembly including upper and lower gland rings adapted to surround a pipe, packing material disposed therebetween, means joining the gland rings for compressing the packing material between the gland rings to provide a seal between the casing head and pipe, and slip suspension means loosely connected to and depending from the lower gland ring adapted to seat in the casing head slip bowl portion and to be advanced thereby into hanging engagement with the pipe.

2. In well-head equipment including a casing head having a bowl portion and a cylindrical bore portion thereabove, and a string of casing suspended from said bowl portion; a sealing assembly arranged in said cylindrical bore portion comprising upper and lower gland rings and a packing unit therebetween, said packing unit having a pair of molded resilient packing rings respectively engaging said upper and lower gland rings and a pair of thin metal testing rings between said resilient packing rings, means joining said gland rings for compressing said resilient packing rings into sealing engagement with both the casing and said cylindrical bore portion of the casing head; and slip elements loosely connected to and depending from the lower gland ring adapted to seat in the bowl portion and anchor the sealing assembly.

3. In well-head equipment including a casing head having a bowl portion and a cylindrical bore portion thereabove, and a string of casing suspended from said bowl portion; a sealing assembly arranged in said cylindrical bore portion comprising upper and lower gland rings and a packing unit therebetween, said packing unit having a pair of molded resilient packing rings respectively engaging said upper and lower gland rings and a pair of thin metal rings between said resilient packing rings; and means carried by said gland rings for compressing said resilient packing rings into sealing engagement with both the casing and said cylindrical bore portion of the casing head.

4. Well-head equipment, as recited in claim 3, wherein said packing compressing means includes headed bolts threaded into one of said gland rings and extending through the other gland ring.

5. Well-head equipment as recited in claim 3 wherein said packing compressing means includes headed bolts threaded into the lower gland ring and extending through the upper gland ring, and means is provided for testing for leakage around the compressed packing rings including a passageway in one of said bolts.

6. Well-head equipment as recited in claim 3 wherein said packing compressing means includes headed bolts threaded into the lower gland ring and extending through the upper gland ring; and means is provided for testing for leakage around the compressed packing rings including a passageway in one of said bolts leading between said packing rings, and radial passageways formed in said metal rings to convey fluid under pressure to the surfaces of both the casing and casing head.

7. Well-head equipment as recited in claim 3 wherein said packing compressing means includes headed bolts threaded into the lower gland ring with their heads seated against the upper gland ring; and means is provided for testing for leakage around the compressed packing rings including a passageway in one of said bolts leading between said packing rings, and radial passageways formed in said metal rings communicating with the bolt passageway to convey fluid under pressure to both the casing and casing head, said radial passageways being formed by mating oppositely facing grooves in said metal rings.

8. A sealing unit for use around well casing and the like comprising a pair of molded resilient packing rings and thin metal test rings of somewhat lesser diameter than the packing rings arranged between the packing rings so that annular spaces are formed adjacent the inner and outer edges of the metal rings, said metal rings having passageways therein connecting said annular spaces, and means for holding said rings together in a unitary assembly.

9. Means for sealing and testing for leakage between a casing head and a pipe suspended therein, comprising a sealing assembly surrounding said pipe having a plurality of resilient packing rings separated by thin metal test rings in which are arranged passageways for conducting fluid under pressure to both the pipe and casing head, upper and lower gland rings respectively engaging the upper and lower packing rings, and means carried by said gland rings for compressing said packing rings into sealing engagement with the pipe and casing head, one of said gland rings carrying a member having a passageway therein leading to said passageways in said metal rings whereby fluid under pressure may be introduced therein for testing the seals formed by said compressed packing rings.

10. Means for sealing between well-head equipment members including a casing head, a pipe suspended therein and extended upwardly therebeyond, a well member superposed upon the casing head and surrounding the upper portion of said pipe, and a seal ring arranged between the casing head and said well member, said means for sealing comprising a sealing assembly arranged between the pipe and casing head comprising resilient packing rings, upper and lower gland rings above and below said packing rings, means joining the gland rings for compressing said packing rings into sealing engagement with the pipe and casing head, the upper gland ring having a cylindrical extension arranged between the upper extremity of said pipe and said well member, and packing means between the cylindrical extension and the well member to restrain pressure emanating from within the pipe from reaching said sealing ring between the casing head and well member.

11. Means for sealing between well-head equipment members including a casing head, a pipe suspended therein and extended upwardly therebeyond, a well member superposed upon the casing head and surrounding the upper portion of said pipe, and a seal ring arranged between the casing head and said well member, said means for sealing comprising a sealing assembly arranged between the pipe and casing head comprising resilient packing rings, upper and lower gland rings above and below said packing rings, means joining the gland rings for compressing said packing rings into sealing engagement with the pipe and casing head, the upper gland ring having a cylindrical extension arranged between the upper extremity of said pipe and said well member, and O-ring packing means between said cylindrical extension and well member to restrain pressure emanating from within the pipe from reaching said sealing ring between the casing head and well member.

12. Means for sealing between well-head equipment members including a casing head, a pipe suspended therein and extended upwardly therebeyond, a well member superposed upon the casing head and surrounding the upper portion of said pipe, and a seal ring arranged between the casing head and said well member, said means for sealing comprising a sealing assembly arranged between the pipe and casing head comprising resilient packing rings, upper and lower gland rings above and below said packing rings, means joining the gland rings for compressing said packing rings into sealing engagement with the pipe and casing head, packing means between the upper gland ring and said well member intermediate the upper end of the pipe and the seal ring between the casing head and well member to restrain pressure emanating from within the pipe from reaching said last-mentioned sealing ring, an annular recess formed in the inner periphery of said upper gland member, packing means arranged in said recess, and means including a passage through said well member for conducting plastic packing against the outer face of said last-mentioned packing member to force it into sealing engagement with the upper portion of said pipe.

13. Means for sealing between well-head equipment members including a casing head, a pipe suspended therein and extended upwardly therebeyond, a well member superimposed upon the casing head and surrounding the upper portion of said pipe, and a seal ring arranged between the casing head and said well member, said means for sealing comprising a sealing assembly arranged between the pipe and casing head comprising resilient packing rings, upper and lower gland rings above and below said packing rings, means carried by the gland rings for compressing said packing rings into sealing engagement with the pipe and casing head, the upper gland ring having a cylindrical extension arranged between the upper extremity of said pipe and said well member, a plurality of annular grooves in said cylindrical extension, and packing means arranged in said grooves to restrain pressure emanating from within the pipe from reaching said sealing ring between the casing head and well member, an annular recess formed in the inner periphery of said cylindrical extension, packing means arranged in said recess, and means carried by said well member for conducting plastic filler against the outer face of said last-mentioned packing member to force it into sealing engagement with the upper portion of said pipe.

14. Means for sealing and testing for leakage between well-head equipment members including a casing head, a pipe suspended therein and extending above the casing head, a well member superposed upon the casing head, and a sealing ring arranged between the casing head and said well member, said means for sealing and testing comprising a sealing assembly arranged between said pipe and the casing head including a pair of resilient packing rings separated by thin metal test rings in which are arranged passageways for conducting fluid under pressure to both the pipe and casing head, upper and lower gland rings respectively engaging the upper and lower packing rings, and means mounted in said gland rings for compressing said packing rings into sealing engagement with the pipe and casing head and providing a passageway therein for conducting a test pressure to said passageways in said metal rings whereby fluid under pressure may be introduced therein for testing the seals formed by said compressed packing rings, said upper gland ring having an upwardly extending cylindrical portion arranged between the upward extension of said pipe and said well member, packing means arranged to extend beyond the outer periphery of said cylindrical portion into engagement with a wall of said well member, a packing member arranged in the inner periphery of said cylindrical portion, means for forcing said last-mentioned packing member into sealing engagement with the upper extension of said pipe, and means for testing the seals effected by all of said packing members and means.

15. A well head seal and suspension means comprising a packing ring, means for expanding the same laterally, a pipe-suspending member below said packing ring, said expanding means and suspending member having interlocking, loose-fitting parts disengageable by relative lateral movement of said means and member whereby when said suspending member is suspending a pipe it will anchor said packing ring against upward movement, and a lost motion retainer for holding said means and member against relative lateral movement to the extent as to disengage the interlocking parts.

HERBERT ALLEN.
MADDEN T. WORKS.

REFERENCES CITED

The following references are of record in the file of this patent:

UNITED STATES PATENTS

| Number | Name | Date |
|---|---|---|
| 2,019,885 | Black | Nov. 5, 1935 |
| 2,073,890 | Tschappat | Mar. 16, 1937 |
| 2,274,477 | Howard et al. | Feb. 24, 1942 |
| 2,313,169 | Penick et al. | Mar. 9, 1943 |
| 2,313,308 | Allen | Mar. 9, 1943 |
| 2,400,254 | Penick | May 14, 1946 |
| 2,447,340 | Jackson | Aug. 17, 1948 |
| 2,471,658 | Shaffer et al. | May 31, 1949 |